Aug. 25, 1953 — K. EFTIHIOS — 2,649,764
APPARATUS FOR RELEASING FROZEN CONFECTIONS FROM MOLDS
Filed Sept. 20, 1950

INVENTOR
KOSMAS EFTIHIOS.

BY
ATTORNEY

Aug. 25, 1953
K. EFTIHIOS
2,649,764
APPARATUS FOR RELEASING FROZEN
CONFECTIONS FROM MOLDS
Filed Sept. 20, 1950
2 Sheets-Sheet 2
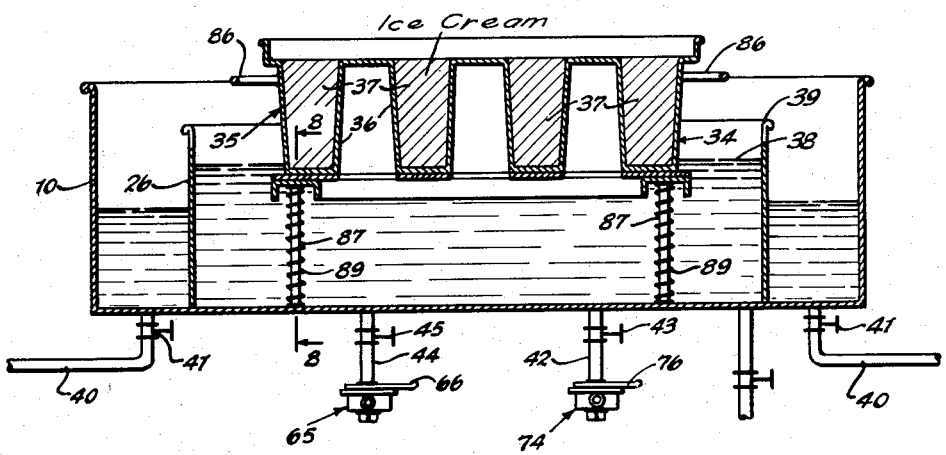
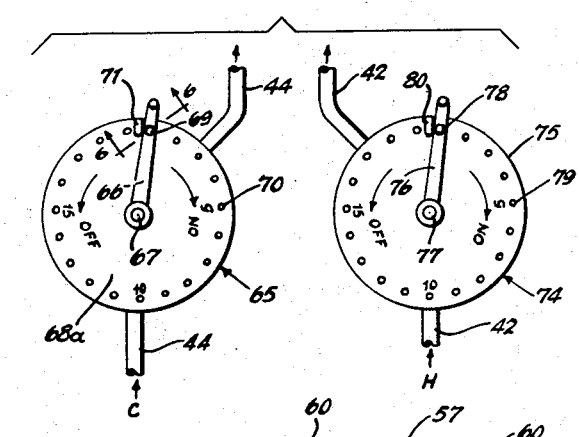
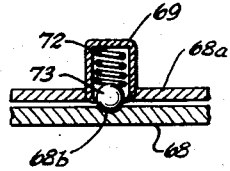
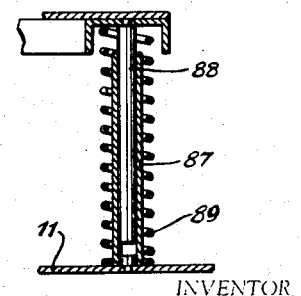
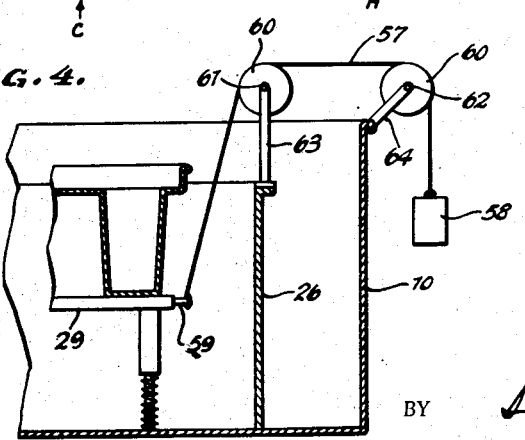
INVENTOR,
KOSMAS EFTIHIOS.
BY
ATTORNEY Patented Aug. 25, 1953

2,649,764

UNITED STATES PATENT OFFICE 2,649,764

APPARATUS FOR RELEASING FROZEN CONFECTIONS FROM MOLDS

Kosmas Eftihios, New Orleans, La.

Application September 20, 1950, Serial No. 185,830

4 Claims. (Cl. 134—56)

The present invention relates to improvements in the method and apparatus for releasing frozen confections from molds and has for an object the provision of a method and an apparatus of this character by which the frozen confection can be quickly released from the mold by an unskilled person without danger of spoiling the confection.

It has been the practice in the making of frozen confections which are mounted on a stick such as "popsicles" and "Eskimo Pies" to pour the ice cream in liquid form into molds which carry the sticks. Each of these molds is usually divided into twenty-four individual compartments. These twenty-four individual compartments are immersed in a brine bath or solution to freeze the liquid ice cream until it has reached the desired hardness. In order to remove the frozen confection it has been found expedient to introduce the molds into a bath of warm or hot water to soften the outer film of the frozen confection to permit ready removal of the confection from the molds.

In this process a considerable amount of the brine solution adheres to the outer face of the individual compartments and when the molds are introduced to the warm bath the brine solution which has adhered to the molds is washed off by the warm water and contaminates the warm water bath. In the prior art structure, it has been the practice to use the same bath without changing the water throughout an entire working day so that the water becomes stagnant. Since about 120 molds per hour are introduced into the warm bath, the percentage of the brine content of the stagnant water will rapidly increase and may reach six per cent to eight per cent. When the water of the bath is splashed over the molds into the frozen confection therein the brine content of the water bath will be so high that the frozen confection in that set of molds will be spoiled and rendered unfit for human consumption. The refrigerating brine solution may also contain a corrosion inhibitor as, for example, potassium dichromate, formaldehyde, and the like, in amounts varying between one-half to one per cent by weight taken on the weight of the brine solution. These inhibitors function to prevent the molds present in the brine bath from being corroded by the brine bath. The presence of these inhibitors furnishes an additional reason why the softening bath should be a flowing bath which constantly removes the droplets of brine introduced into the softening bath when the molds are inserted therein. While the molds are provided with a lid, there is still the possibility of careless operators immersing the molds in the softening bath, thereby allowing a portion of the softening bath to seep through at the point of contact of the lid with the side walls of the molds and thereby contaminate the frozen confection, such as ice cream.

It is one of the objects of the present invention to overcome this disadvantage of the prior art which has caused and is continuing to cause great waste of food materials and time. This object is accomplished by keeping to a negligible amount the brine content of the warm fluid bath so that it seldom reaches a concentration of one to ten parts of brine per ten thousand parts of water by weight. In accordance with the present invention this accumulation of the brine content of the warm or hot fluid bath is prevented by subjecting the mold to the action of continuously or intermittently flowing warm or hot fluid for removing the droplets of brine which are introduced into the fluid bath by the mold so that the bath does not build up a brine concentration imparting thereto a salty or briny taste.

The present invention has as another object the provision of an improved apparatus for continually or intermittently introducing warm or hot fluid into the tank into which the molds containing the frozen confection are introduced and for continually or intermittently discharging the water of the bath from the tank. With such an arrangement the water of the bath which has been subjected to the brine-laden molds is continuously or intermittently carried from the tank and a fresh supply of water is being furnished to the bath.

A further object of the present invention is to provide an improved apparatus of this kind which insures that the mold containing the frozen confection cannot be immersed in the hot water bath to such a depth that the water bath will overflow over the upper edge of the mold and into the frozen confection.

A still further object of the present invention is to provide an improved apparatus of this character which is simple in construction, economical to manufacture and contains few moving parts to wear out or get out of order.

A still further object of the present invention is to provide an apparatus of the character set forth with a valve indicator dial.

With the foregoing and other objects in view, the invention will be hereinafter more fully described and more particularly pointed out in the appended claims.

The invention will be illustrated by the accompanying drawing, in which:

Figs. 3 and 4 are longitudinal sectional views of further modification where weights are employed to insure the automatic depressing and elevation of the platform or table carrying the molds;

Fig. 5 is a plan view of the valve control indicator dial mechanism;

Fig. 6 is a sectional view taken on line 6—6 of Fig. 5;

Fig. 7 is a longitudinal sectional view of a further modification of the invention which is adapted to be used with the dial control mechanism set forth in Fig. 5; and Fig. 8 is a transverse vertical section taken on line 8—8 of Fig. 7.

Figure 1:
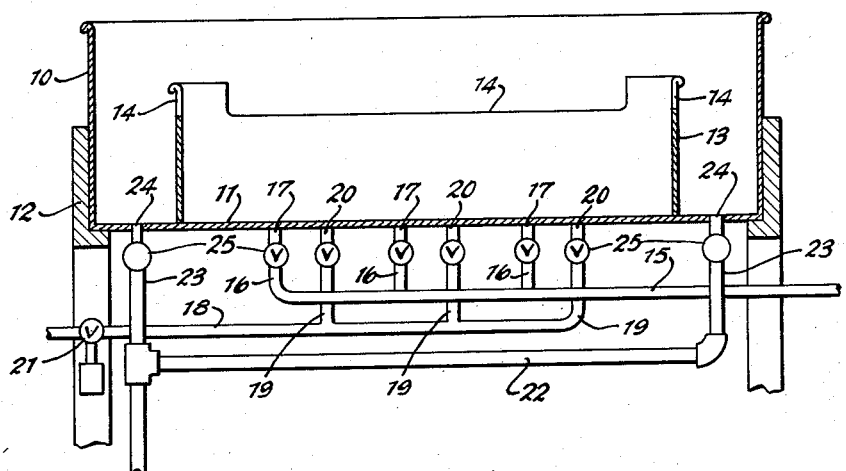
Fig. 1 is a longitudinal sectional view of the improved apparatus with parts shown in elevation and parts broken away.

Referring to Fig. 1, 10 indicates a tank having a bottom 11 which rests on a supporting member 12. Disposed within the outer tank 10 is an inner tank or container 13 secured to the bottom 11 of the tank. The sides and ends of the container or inner tank 13 are cut away, as indicated at 14, to provide a weir for permitting the hot fluid bath to flow out of said inner tank and into the outer tank 10. The hot fluid bath in the inner tank 13 flows around the molds 36 of the mold member 35 when the mold is introduced into the inner tank 13. Cold water is supplied by means of a pipe 15 and branch pipes 16 which connect with the interior of the tank 13 through suitable openings 17 in the bottom 11 of the outer tank 10, said bottom being also a common bottom for the inner tank 13. The cold water pipe 15 is connected to a suitable source of water supply. For the purpose of heating the cold water in the inner tank 13, steam from any suitable source of supply is introduced into the interior of the tank by the pipe 18 and branch pipes 19. The pipe 18 and branch pipes 19 communicate with the interior of the tank 13 through appropriate openings 20 in the bottom 11 of the tank 13. A thermostatic valve 21 is disposed within the steam pipe 18 to automatically control the flow of steam to the tank 13.

A discharge pipe 22 having branches 23 communicates with the interior of the outer tank 10 through openings 24. Appropriate valves 25 are disposed within the cold water tank 15 and its branches 16, the steam pipe 18 and its branches 19, and the discharge pipe 22 and its branches 23 for controlling the flow of fluid therethrough.

Figure 2:
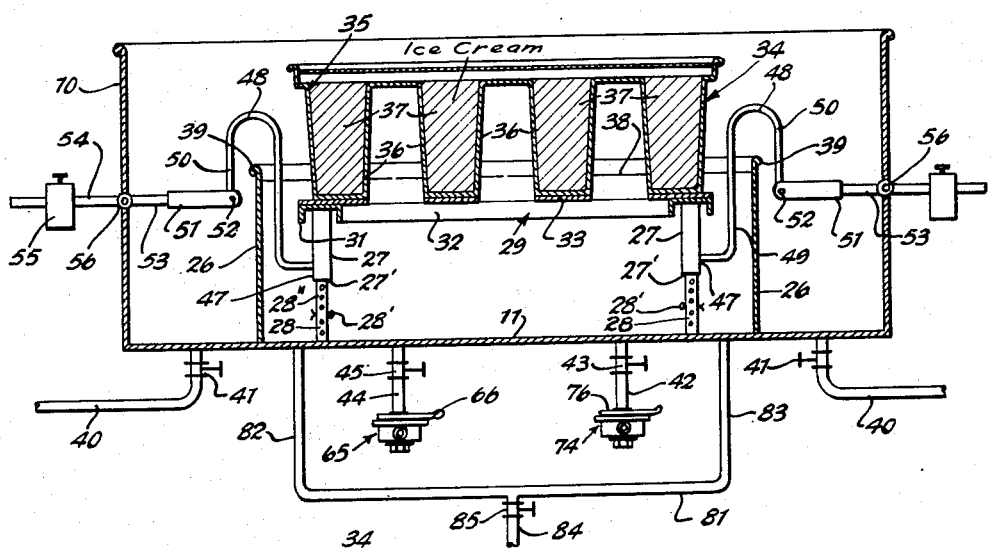
Fig. 2 is a longitudinal sectional view of a modified form of the invention with certain parts shown in elevation and certain parts broken away.

Referring more particularly to Fig. 2, within the tank 10 there is disposed, preferably concentrically therewith, an inner tank 26 of somewhat different structure than that shown in Fig. 1. The inner tank 26 may be mounted on the bottom 11 of the tank 10 in any desired manner. Disposed within the tank 26 and mounted on the channels thereof are four vertically extending tubes 27 which telescopically receive legs 28. The tubes 27 are carried at each corner of a table or platform 29. In the downward travel of leg 27 the end 27' thereof strikes cotterpin 28' positioned in apertures 28'' of the leg 28. The table or platform 29 is of skeleton formation having side pieces 32 and end pieces 31 preferably formed of inverted channel bars and spaced apart flat bars 33 supported by the side pieces 32 and end pieces 31.

Disposed on the platform 29 is a mold member 34 comprising a plurality of molds 35, each having a compartment 36 which engages the bars 33 of the table or platform 29. Each of the compartments 36 carries a frozen confection 37, as for example, ice cream. The table or platform 29 is shown in Fig. 2 in its elevated position.

In order to immerse the mold member 34 and its molds 35 to the proper depth, the operator places the mold member 34 and the molds 35 upon the table 29. The weight of the loaded mold member and the table causes the table to move downwardly so that the mold members and their compartments carrying frozen confection are immersed in the fluid bath of regulated temperature. The upper edge 39 of the inner tank 26 is disposed above the liquid level 38 of the fluid in the tank 26 so that the liquid of the bath will not ordinarily flow over the top edge 39. However, when the mold member 34 and the molds 35 are placed upon the table or platform 29, the weight of the loaded mold and the table causes the table to descend and the fluid in the inner tank 26 overflows into the outer tank 10 and then passes through the drainage pipe 40 having a valve 41. In other words, the liquid bath in the inner tank 26 periodically overflows into the outer tank 10 when the mold member and its molds with their frozen contents are immersed in the inner tank. The liquid bath is displaced when the mold members are lowered into the inner tank, causing the overflow of the liquid bath into the outer tank in an amount equivalent to the volume displacement of the mold member which rides on the platform 29 disposed in said inner tank 26. Hot water may be admitted, as clearly indicated in Figure 2, through the pipe 42 provided with control valve 43. Cold water is admitted through the pipe 44 provided with control valve 45. Secured to each of the tubes 27 as at points 47, as shown in Fig. 2, are curved arms 48 preferably in the form of an inverted U-member, each of said members 48 being provided with a long leg 49 and a short leg 50. At the lower end of each short leg 50, there is attached an arm 51, the attachment being preferably by means of a knuckle joint 52. Each arm 51 has telescopically mounted therewith an arm 53, said telescopic mounting being such as to provide for a small amount of axial motion when the arm 53 is moved through its limited angle of motion. Mounted on each side wall of the tank 10 is a ball and socket joint 56 to which the arm 53 and its extension outside of the tank 10 is attached. This extension arm 54 carries a weight 55 which is the proper size to act as a counterweight and cause an upward motion of the platform 29 when the mold member 34 is removed from the platform 29.

By means of the knuckle joint 52 and the ball and socket joint 56, the arrangement set forth operates to provide an upward motion of the platform 29 when the mold is removed from the platform.

Figure 3:
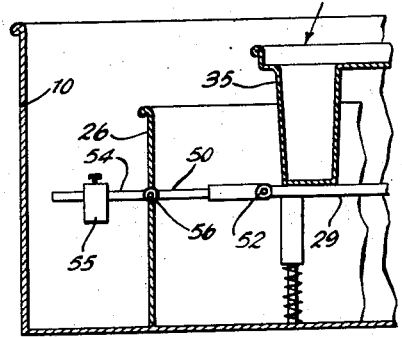

As shown in Fig. 3, a similar counterweight arrangement is employed to cause upward motion of the platform 29 when the mold is removed therefrom, with the exception that the outer tank is somewhat larger to permit the arm 54 together with the counterweight 55 to operate within the confines of the outer tank 10. The knuckle joint 52, as shown in Fig. 3, is directly connected to the platform 29. The position of the counterweight 55, as shown in Figs. 2 and 3, may be varied by sliding the same on the arm 54, the counterweight being fixed in position by means of a set screw as shown. Obviously the bottom position of the platform 29 is regulated by the position of the cotterpin 28'.

There is disclosed in Fig. 4 another arrangement for the automatic projection of the platform or table 29. As shown in Fig. 4, there is provided a cable 57 carrying weight 58 of the proper size to lift the platform 29 when the mold member 34 is removed from the platform. The cable 57 carrying a weight 58 is attached to an extension 59 on one end of the table member 29. The pulleys 60 are mounted on suitable shafts 61 and 62 journaled respectively on standards 63 and 64.

In one form of the invention, the temperature of the bath present in the inner tank 26 may be effected by thermostatic control.

The apparatus herein set forth and especially that shown in Fig. 2 of the drawing, may be provided with a valve setting control mechanism, as shown in Figs. 5 and 6. The cold water conduit is designated "C" and the hot water conduit is designated "H". The conduit C is provided with a valve 65 having an upper disk member 68 on which is mounted a ring or rim member 68ª. The disk 68 may constitute and be continuous with the upper portion of the outer shell of any standard plug or globe type of valve which is made to open or close by the rotation of a valve stem or shank present in standard valves of the type set forth. For example, the valve may be a standard globe type valve with a screw shank on the closing plug or setting member. The threads of the screw shank desirably have a pitch of such value that one revolution of the shank enables the valve to change from a full open to a full closed position by the rotation of a valve arm, such as the arm 66 which fits at one end on the upper end of the valve shank 67.

Intermediate the end of the valve arm 66 there is provided a pin or boss 69 which moves with and as the valve arm 66 is rotated or moved. The ring or rim member 68ª is provided with a series of apertures 70, usually nineteen or twenty thereof, which function as setting stations. The valve handle 66 can pass through an arc of about 360° but cannot pass through a circle of more than one revolution in view of the provision of the stop plug 71. The pin 69 is a tubular member which is provided with a spring member 72 and a ball 73, the latter being adapted to be received in the socket 68ᵇ of the disk 68.

The cold water branch 44 in that form of the invention shown in Figure 2 is in operative connection with the cold water valve 65.

Similarly, the hot water conduit H is provided with a valve 74 having a ring or rim member 75. A valve arm 76 is fitted at one end on the upper end of the valve shank 77. Intermediate the end of the valve arm 76 there is provided a pin or boss 78 which moves with and as the valve arm 76 is rotated or moved. The ring or rim member 75 is provided with a series of apertures 79 which function as setting stations. The valve handle 76 can pass through an arc of about 360° but cannot pass through a circle of more than one revolution in view of the provision of the stop plug 80.

The pin 78 is identical with the structure of the pin and its cooperating parts shown in Fig. 6. The hot water branch conduit 42 in that form of the invention shown in Fig. 2 is in operative connection with the hot water valve 74. A valve indicator of the character described enables an operator to determine the optimum setting conditions for the supply of hot water or steam through the hot water pipe 42, to the inner tank 26, as well as the rate of flow of cold water through the cold water conduit 44, shown in Fig. 2, which supplies cold water to the inner tank 26.

When using the valve indicator of the character set forth, the tank 26 may be provided with drainage member 81 provided with branches 82 and 83, respectively. The drainage member 81 may be provided with a drainage outlet 84 having a valve 85. The indicator valve permits the quick closing of the hot water and cold water control valves prior to lunch-time and enables the operator on resumption of operations after the lunch hour to make certain that the identical temperature control conditions are present in the bath contained in the inner tank 26. In other words, the operator maintains the identical temperature control conditions after lunch which were found to be most suitable prior to lunch.

In connection with the above, it may be stated that the inner tank 26 is drained by means of the drainage conduit 81 prior to lunch time or at the end of any particular cycle of operation. At the termination of the cycle of operations prior to lunch time, for example, the cold water arm 69 may be set at station 18 and the hot water arm 76 may be set at station 5. The operator takes note of this setting and then proceeds to drain the tank 26. In fact, the arm settings are recorded on paper, slate or the like when said valves are closed just prior to the lunch hour and the inner tank 26 is drained. The valve arms may be quickly reset to exactly the same stations and then cold water and hot water or steam introduced into the tank 26 in correct proportions and with the correct temperature which prevailed prior to lunch hour to thereby insure the proper release of the ice cream in the molds. This, of course, assumes the constant temperature of both the hot and cold water feed supply lines, that is, they are at the same temperature before lunch time as they are after lunch time.

While, as stated, the plug type or globe type of valve is preferred, under special conditions a gate type of valve may be used provided the pitch of the lead screw on the shank of said valve will provide for complete opening and closing within approximately 350° of rotation. It is, of course, recognized that the full opening and closing of a standard plug valve is completed in 90° of rotation, in which case the valve indicator dial will be calibrated with numbers and with markings indicating the full open and closed positions.

The form of the invention shown in Fig. 7 is basically similar to that shown in Fig. 2, with the exception that the means for automatically returning the table and the mold member to a position of the liquid level line comprises a special arrangement. Disposed within the tank 26 and mounted on the bottom thereof are four vertically extending tubes 87 which telescopically receive legs 88, carried at each corner of the table or platform 29. A coil spring 89 surrounds each of the tubes 87 and legs 88, the lower end of each spring 89 engages the bottom 11 of the tank 10 and the upper end of each spring pushes against the bottom of the platform or table. The table or platform 29 is of skeleton formation having side pieces 32 and end pieces 31 preferably formed of inverted channel bars and spaced apart flat bars 33 supported by the side pieces 32 and end pieces 31. Each spring 89, if desired, may seat in the channel bar.

Disposed on the platform 29 is a mold member 34 comprising a plurality of molds 35, each having a compartment 36 which engages the bars 33 of the table or platform 29. Each of the compartments 36 carries a frozen confection 37 as, for example, ice cream. The table or platform 29 is shown in Fig. 7 in its elevated position due to the influence of the coiled springs 89. In order to immerse the mold member 34 and its molds 35 to the proper depth, the operator places the mold member 34 and the molds 35 upon the table 29. The weight of the loaded mold member and the table causes the table to move downwardly so that the mold members and their compartments carrying frozen confection are immersed in the fluid bath of regulated temperature. The vertical helical springs 89 are designed to exactly compensate for the weight of the molds and ice cream content, length and buoyance and loss in weight when immersed in the fluid present in the tank 26. The upper edge 39 of the inner tank 26 is disposed above the liquid level 38 of the fluid in the tank 26 so that the liquid of the bath will not ordinarily flow over the top edge 39. However, when the mold member 34 and the molds 35 are placed upon the table or platform 29, the weight of the loaded mold and the table, as stated, overcomes the action of the coiled springs 89, and the fluid in the inner tank 26 overflows into the outer tank 10 and then passes through the drainage pipe 40 having a valve 41. In other words, the liquid bath in the inner tank 26 periodically overflows into the outer tank 10 when the mold member and its molds with their frozen contents are immersed in the inner tank. The liquid bath is displaced when the mold members are lowered into the inner tank, causing the overflow of the liquid bath into the outer tank in an amount equivalent to the volume displacement of the mold member which rides on the platform 29 disposed in said inner tank 26. Hot water may be admitted through the pipe 42 provided with control valve 43. Cold water is admitted through the pipe 44 provided with control valve 45.

The mold members 34 are introduced sequentially at the rate of two molds per minute. Since the ice cream confection has previously been frozen in a brine solution which is both salty and bitter as it contains both sodium and calcium chloride, and the molds are introduced immediately and directly from the brine solution, droplets of brine solution adhere to the outer faces of the molds 35 and the mold members 34 and are carried thereby into the hot bath in the tank 26. The water of the bath in the tank 26 washes off these droplets of brine solution but the concentration of the brine in the water of the bath is kept between one to ten parts per ten thousand parts of water by the continuous flow of the hot fluid of the bath into and out of the inner tank 26. As previously stated, cold water is continuously introduced through the cold water conduit 44 and hot water or steam, and preferably steam, is continuously or periodically introduced through the hot water or steam conduit 42.

The cost of producing steam is more than compensated for in economies effected by preventing of the spoilage of the frozen confections due to the splashing of the salty and bitter solution, which occurs when operating with the prior art structures. However, instead of introducing water and steam into the inner tank 26, warm water having a temperature varying between 150° and 195° F., and preferably between 160° and 190° F., may be introduced directly into the tank 26 releasing the cold water conduit 44 or the hot water conduit 42 together with its corresponding valve.

In accordance with the present invention, there has been provided an outer tank having an exterior member and a top edge portion; an inner tank adapted to receive a fluid softening bath, said tank having an exterior member or wall and a top edge and disposed in the outer tank with its top edge below the top edge of the outer tank. The exterior wall of the inner tank is spaced from the interior wall of the outer tank. Both of these tanks may be circular in shape or rectangular in shape. Means are provided for passing a portion of the liquid softening bath from the inner tank to the outer tank when a mold member containing the frozen confection is disposed in the inner tank. Means are connected to the outer tank for draining therefrom the overflow softening liquid received from the inner tank. Means are also provided for introducing softening medium into the inner tank.

Means are also provided for limiting the downward movement in the inner tank of the supporting member when a mold member containing the frozen confection is placed on the supporting member. Means are also provided for automatically raising the supporting member when the mold member is removed from the supporting member. The means for automatically raising the supporting member may be that shown in Fig. 2, or the spring arrangement shown in Fig. 7.

The means for automatically raising the supporting member when the mold member is removed from the supporting member may comprise, in one form of the invention, a downwardly projecting member mounted on the supporting member and telescoping with a downwardly extending member preferably fastened to the inner tank, as by welding to the bottom of the inner tank. The telescoping members may be provided with operating stops so as to limit the longitudinal distance that the members may telescope one with respect to the other. The first arm, for example arm 48, is secured to the downwardly projecting member, for example 27. This arm extends over and clears the top edge 39 of the inner tank 36 throughout the range of the vertical movement. A second arm is provided which is connected to the first arm and passes through the exterior wall of tank 10, said arm being mounted to provide for a relatively small amount of axial motion. A weight is mounted on said second arm outside of the exterior member or wall of the outer tank, said weight being sufficiently heavy to cause an upward movement of the supporting member when mold member containing the frozen confection is removed from the supporting member.

Valve means are provided for draining the inner tank when it is desired to interrupt the releasing and softening treatment of the mold member. There is also provided a separate cold water valve and a hot water valve both in operative connection with the inner tank. Indicating means are provided for indicating the position of the cold water valve prior to the draining of the inner tank, and a second indicating means is provided indicating the position of the hot water valve prior to drainage. Each of said indicating means includes an upper disc member having an outer ring portion provided with a series of apertures, said disc member being mounted on the upper portion of the valve, the latter being provided with a valve shank. An arm is mounted on said valve shank for rotative movement. The arm is provided adjacent its outer extremity with a pin. Stop means are provided inhibiting the valve arm from passing through a circle of more than one revolution.

In general, the ice cream mold member or container is placed on the table or platform 29 within the inner tank 26 which carries hot water which may be made by mixing hot and cold water or steam and cold water, said water being at a level slightly below the edges of the overflowing container 26, as specifically shown in Fig. 7. When the ice cream mold and the platform is pressed downwardly, it displaces a volume of water equivalent to the submerged portion of the mold, and the mold is retained in the water until the necessary amount of heat units have been absorbed to provide the necessary heat of fusion to the ice cream adjacent to the mold member. The latter is then promptly removed from the inner immersion tank 26. A period of 30 seconds or less is a sufficient period of immersion. The level of the liquid in the inner tank 36 is lower than the edges of the tank 26 by the volume of water which has overflowed the edges of the inner tank 26 into the outer tank 10.

In a preferred form of the invention, the use of the device is based on the adjustment of the hot and cold indicating discs, both regulated as to mixture of hot and cold water and the rate of flow to refill the inner tank 26 with additional warm water in order to maintain a reasonably uniform temperature in the inner tank 26 and to correct for the heat absorbed by the ice cream mold, that is, the absorbed heat for the release of the ice cream in the mold member.

It is desired to state that automatic controls may be used to control the temperature of the water in the inner container 26 and the rate of flow of the water through the container 26. In one form of the present invention, there is an intermittent flow of water or softening liquid from the inner tank 26 to the outer tank 19, as hereinbefore set forth. However, the apparatus may be operated continuously by having a continuous flow of water from the inner tank to the outer tank, the flow of water from the inner tank to the outer tank being much greater at the time the mold member 34 is inserted in the inner tank. In this manner, there is close control upon the brine content of the water present in the tank 26.

This application is a continuation-in-part of application Serial No. 39,554, filed July 19, 1948, now matured as a patent numbered 2,637,668, dated May 5, 1953.

What I claim is:

1. In an apparatus for releasing frozen confections from mold sections of a mold member, the contents of which have been frozen in a brine solution, each of said mold sections having adhering thereto on its outer face droplets of brine solution, the combination of an outer tank having a wall member provided with a top edge, an inner tank adapted to receive a liquid softening bath and having a wall member provided with a top edge, said inner tank being disposed in said outer tank with the top edge of the inner tank below the top edge of the outer tank, a supporting member for mold sections mounted in said inner tank for vertical movement therein, means for limiting vertical downward movement of the supporting member when a mold member containing the frozen confection is placed upon said supporting member when the mold member is removed from the supporting member, said means comprising a downwardly projecting member mounted on the supporting member inter- engaging telescoping parts on said support member and inner tank, operating stops on said members extending over and clearing the top edge of the inner tank throughout the range of vertical movement of the arm, and a second arm connected to said first arm and passing through the exterior wall of the outer tank, said arm being mounted to provide for a relatively small amount of axial motion, and a weight on said second arm outside the wall of the outer tank, the weight being sufficiently heavy to cause an upward movement of the supporting member when the mold member containing the frozen confections is removed from the supporting member, means connected to the outer tank for draining overflow liquid received from the inner tank, and means for introducing softening liquid into the inner tank.

2. The apparatus defined in claim 1 in which the second arm comprises a primary portion connected by means of a knuckle joint to said first arm, a secondary portion telescoping with said first portion, said secondary portion passing through the exterior wall of outer tank and having a ball-and-socket connection therewith.

3. In an apparatus for releasing frozen confections from mold sections of a mold member, the contents of which have been frozen in a brine solution, each of said mold sections having adhering thereto on its outer face droplets of brine solution, the combination of a tank adapted to receive a fluid softening bath, a container disposed within said tank and secured to the bottom thereof, the sides of said container being cut away to provide a weir for permitting hot fluid to flow out of said container into said tank, conduit means for conveying cold fluid from a source of supply to said container, conduit means for introducing a heating medium to the interior of said container, a thermostatic valve disposed in said last named conduit means for automatically controlling the flow of heating medium therethrough, conduits communicating with said tank for the egress therethrough of fluid from said tank, a plurality of vertically disposed spaced parallel legs extending upwardly from the bottom of said tank, tubes slidably mounted on said legs, a platform secured to the upper ends of said tubes, said platform providing a support for the mold member, the liquid in the container being displaced therefrom into said tank when the mold member is immersed in the fluid in the container, said legs being provided with a plurality of spaced openings, a stop member detachably seated in said openings for engagement by the lower end of said tubes to limit downward movement of said platform.

4. In an apparatus for releasing frozen confections from mold sections of a mold member, the contents of which have been frozen in a brine solution, each of said mold sections having adhering thereto on its outer face droplets of brine solution, the combination of a tank adapted to receive a fluid softening bath, a container disposed within said tank and secured to the bottom thereof, the sides of said container being cut away to provide a weir for permitting hot fluid to flow out of said container into said tank, conduit means for conveying cold fluid from a source of supply to said container, conduit means for introducing a heating medium to the interior of said container, a thermostatic valve disposed in said last named conduit means for automatically controlling the flow of heating medium therethrough, conduits communicating with said tank for the egress therethrough of fluid from said tank, a plurality of vertically disposed spaced parallel legs extending upwardly from the bottom of said tank, tubes slidably mounted on said legs, a platform secured to the upper ends of said tubes, said platform providing a support for the mold member, the liquid in the container being displaced therefrom into said tank when the mold member is immersed in the fluid in the container, said legs being provided with a plurality of spaced openings, a stop member detachably seated in said openings for engagement by the lower end of said tubes to limit downward movement of said platform, a curved arm secured to each of said tubes, a straight arm pivotally connected to each of said curved arms, a body member telescopically mounted in each of said straight arms and pivotally connected to said tank, an extension projecting from said body member and a weight mounted on said extension and arranged exteriorly of said tank.

KOSMAS EFTIHIOS.

References Cited in the file of this patent

UNITED STATES PATENTS

| Number | Name | Date |
|---|---|---|
| 1,482,281 | Wortman | Jan. 29, 1924 |
| 2,237,209 | Arnold | Apr. 1, 1939 |
| 2,289,312 | Whitesell | July 7, 1942 |
| 2,330,655 | Zucker | Sept. 28, 1943 |
| 2,341,894 | Bariffi | Feb. 15, 1944 |
| 2,463,307 | Price | Mar. 1, 1949 |
| 2,466,769 | Herold | Apr. 12, 1949 |